(12) United States Patent
Rapeli

(10) Patent No.: US 6,202,932 B1
(45) Date of Patent: Mar. 20, 2001

(54) CONTACTLESS COUPLING BETWEEN A HOST UNIT AND A SMART CARD

(76) Inventor: Juha Rapeli, Lutherweg 25, D-52074 Aachen (DE)

(*) Notice: Subject to any disclaimer, the term of this patent is extended or adjusted under 35 U.S.C. 154(b) by 0 days.

(21) Appl. No.: 09/409,912

(22) Filed: Oct. 1, 1999

Related U.S. Application Data (63) Continuation of application No. PCT/FI98/00292, filed on Apr. 1, 1998.

(30) Foreign Application Priority Data

Apr. 2, 1997 (FI) .......................................... 971359

(51) Int. Cl.[7] .............................. G06K 19/06; G06K 5/00
(52) U.S. Cl. ........................... 235/491; 235/380; 235/492
(58) Field of Search ................................. 235/380, 487, 235/491, 454; 340/825.72; 369/13, 18, 44.37, 116, 120

(56) References Cited

U.S. PATENT DOCUMENTS

| 3,971,916 | 7/1976 | Moreno | 364/221 |
|---|---|---|---|
| 4,742,573 | 5/1988 | Popovic | 235/454 |
| 4,783,598 | 11/1988 | McAdams, Jr. | 235/454 |
| 5,122,644 * | 6/1992 | Hasegawa et al. | 235/462 |
| 5,196,682 | 3/1993 | Englehardt | 235/454 |
| 5,434,401 * | 7/1995 | Bauser | 235/454 |

FOREIGN PATENT DOCUMENTS

| 30 47 322 | 7/1982 | (DE) . |
|---|---|---|
| 195 00 805 | 7/1996 | (DE) . |
| 0 056 064 | 7/1982 | (EP) . |
| 0 387 383 | 9/1990 | (EP) . |
| 2 278 085 | 11/1994 | (GB) . |

* cited by examiner

*Primary Examiner*—Donald Hajec
*Assistant Examiner*—Larry D Taylor
(74) *Attorney, Agent, or Firm*—Young & Thompson (57) ABSTRACT

A method and module for transferring energy, clock frequency and data information without using an electrically conducting connection between a portable module and host equipment. Energy is transferred as optical radiation from at least two distinct light sources with intensities alternating between the minimum and maximum values in such a way that when one intensity goes from minimum to maximum the other goes from maximum to minimum wherein total intensity of optical radiation received by the module and supply voltage formed therefrom is nearly constant. The clock frequency is formed by and detected as the cyclical alteration of light intensities. Data is transferred as a modulation of the clock frequency.

14 Claims, 7 Drawing Sheets prior art

CONTACTLESS COUPLING BETWEEN A HOST UNIT AND A SMART CARD

This application is a continuation of international application PCT/FI98/00292 filed Apr. 1, 1998, which designated the United States.

FIELD OF THE INVENTION

The invention relates to a portable information storage and processing module which is connected to a host unit and a method of exchanging information between the module and the host unit. The invention relates especially to a so called 'smart card' which consists of an integrated circuit chip attached to a plastic card and contact areas on the surface of the plastic card to provide the necessary energy supply to the chip and data transmission to and from the chip.

BACKGROUND OF THE INVENTION

The standards ISO 7816 and ETS 300 608 (ETSI, code GSM 11.11) define the smart card solutions for the world wide used Global System for Mobile Communications System (GSM) by which information storing is made permanently protected.

Figure 1:
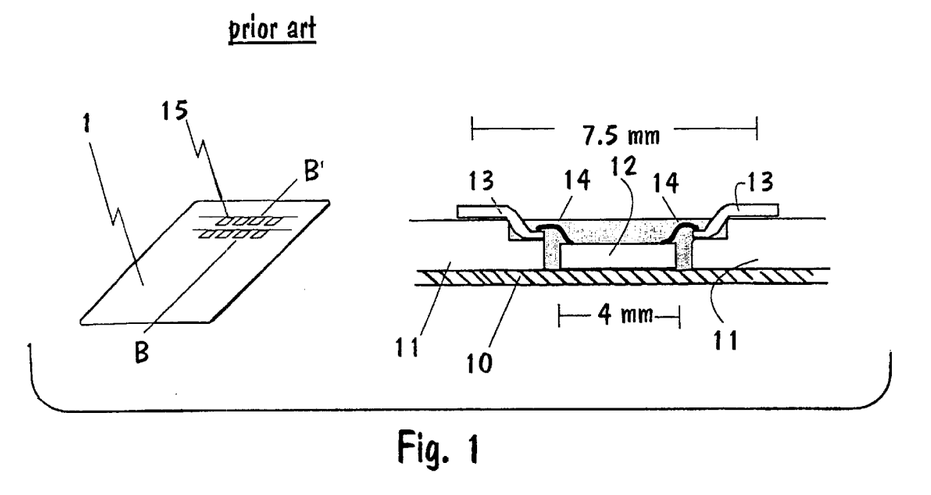
FIG. 1 depicts a smart card and its structure as known in the state of the art.

FIG. 1 presents a typical ISO 7816 smart card, 85×53×0.8 mm in size, provided with the eight electrical contacts 15 to the integrated circuit chip inside the card. It also shows one way to encase the encapsulate smart card chip 12. Firstly, the card is laminated from the bottom 10 and middle 11 to which a stepped cavity is produced for the integrated circuit chip 12. Then, the golden or gold plated surfaces 13 are laminated or grown over the stepped side walls and they also form the contact areas 15 which are visible on the surface of the smart card.

According to one manufacturing process the integrated circuit chip 12 of the smart card 1 is glued to the bottom of the cavity and then bonded with gold wire 14 with known methods to the golden contact areas 15 located at the side wail of the cavity. After this the cavity is filled with hardening plastic material so that the contact areas 15 remain visible on the top. According to the ISO 7815 standard the distance between the centre points of the contact areas 15 must be 7.5 mm which means that the width of the integrated circuit chip in the direction B–B' in FIG. 1 can be at most 4 mm.

Figure 2:
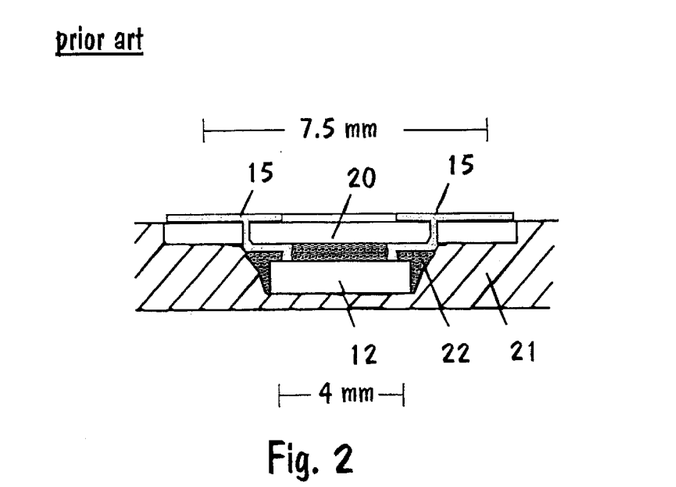
FIG. 2 shows a cross-section of a smart card.

Other methods for attaching the integrated circuit chip to the smart card are also known. For example, in FIG. 2 a circuit board 20 is used as the substrate and as a contact surface for the integrated circuit chip 12. This circuit board is then embedded into a suitable card base 21 of pre-defined size to form the desired smart card. This structure demands the use of a filling material 22 which also fills the space between the integrated circuit chip 12 and the circuit board 20.

Figure 3:
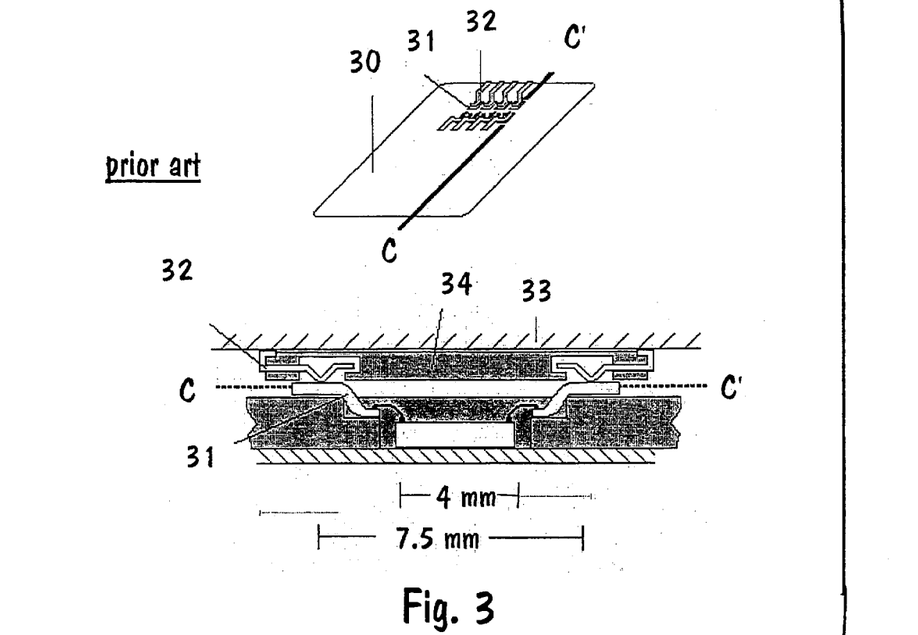
FIG. 3 illustrates a smart cards attachment to a host unit.

FIG. 3 represent a widely used solution to connect the smart card 30 to a host unit. The contact areas 31 of the smart card 30 are brought in to a mechanical contact with the springs 32 which are electrically connected to the host unit via e.g. a circuit board 33 which is supported by a mechanical frame 34. The frame supports the smart card from the contact side mechanically and the springs 32 press the contact areas 31 with their spring force and an electric contact is produced. According to standards ISO 7816 and ETSI 300 608 the spring force should be less than 0.5 N per each contact.

Previously described solutions have their own advantages and disadvantages. A larger semiconductor chip can be attached to the solution in FIG. 2 than to the solution in FIG. 1, but the costs will rise because of the extra circuit board and costly manufacturing and therefore it is significantly more expensive. There are also other restrictions which limit the present use of smart cards, mostly because they deploy the previously described electric contacts with the host unit. This limits the use of for example the operating voltage to 5 or 3 volts, clock frequency etc. In addition, the electric contact surfaces of the smart card are exposed to touching, rubbing and especially to electrostatic discharge.

Because a reliable electric contact must be accomplished between the smart card and the host unit with the allowed less than 0.5 N force, the structure in FIG. 3 must be very stable and the contact surfaces 31 and 32 must be gold or gold plated. As is known only gold metal can with stand the typical conditions where the smart card is used without oxidizing etc. There fore each contact with the host unit also becomes an extra cost in the manufacturing process.

Previously described solutions use electrical contact between the host unit and the smart card, but also other methods have been introduced. In the publications U.S. Pat. No. 5,206,495, EP 0466 949 A1, DE 42 40 238A1, DE 43 10 334 A1 and U.S. Pat. No. 4,692,604 the contact between the smart card and the host unit is based on a magnetic field through a coil inside the smart card. In the publications EP 0 534 559 A1 and DE 41 38 131 A1 the data transfer is based on electromagnetic radiation in the kHz area.

The closest solution compared to this is the one in GB 2 278085 where both energy and data are transferred between the host and the smart card through optical radiation. The method is however limited to separate photo-voltaic cells which are located at the top of the integrated circuit chip and which convert optical energy into electric current, while the defined current is conducted into the integrated circuit chip through another contact. The optical radiation is focused to the smart card through collimators. The data transfer is suggested to happen with known methods of amplitude modulation. How ever, the application does not include any practical solutions for data transfer and none what so ever for data transfer from the smart card to the host unit. The application also doesn't include any examples of transferring the clock frequency to the smart cards integrated circuit chip. It also leaves open with which values of the parameters the solution is able to work.

This invention has a purpose to present a method with which an information storage and/or processing unit, typically a integrated circuit chip, in a portable device gets energy and the data circuitry it needs without any electric circuitry to the host unit. Then it would be possible to have a portable device which has no conductors between separate parts. Using this method it should be possible to transfer the necessary clock frequency to the integrated circuit chip using optical radiation and to transfer information between the smart card and the host unit at bit-rates up to the said clock frequency.

These goals should be reached with ways that are described in the following independent patent claims.

SUMMARY OF THE INVENTION

In the following we assume that a portable unit consists of a integrated circuit chip, a substrate supporting the chip and protecting structures covering the chip :which we altogether call a smart card. A host unit feeds the smart card its energy and clock frequency and receives data from the smart card. The energy supply and data transfer are possible because of the proximity of the host unit and the smart in such a way that energy is transferred as optical radiation, clock frequency is transferred as energy supply's periodic variation, data is transferred to the smart card as modulation of the clock frequency and from the smart card to the host unit with electromagnetic proximity connection directly from the surface of the integrated circuit chip.

Other methods for the data transfer from the card to the host can also be either capacitive proximity connection or optical reflection modulation in which an area on the surface of the card, pn-surface, changes its reflection coefficient according to the data and in which the host unit notices the changes in the reflection coefficient. In this way the energy consumption in the data transfer from the card to the host is minimal.

The advantages of this invention are amongst other things independent of the operating voltage and reliable and non-contact connection between the card and the host. Also a smart card using this technique would be cheap to manufacture, simple and reliable, and it wouldn't set any limits to the size or form of the semiconductor chip inside the smart card.

BRIEF DESCRIPTION OF THE DRAWINGS

The invention is described more closely with reference to the accompanying drawings, in which.

DETAILED DESCRIPTION OF THE INVENTION

Figure 4:
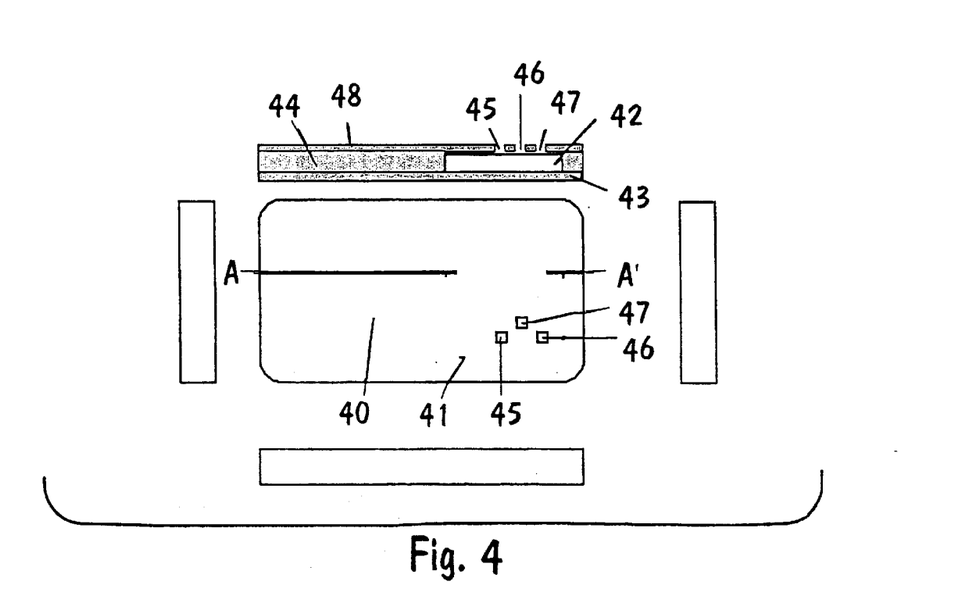
FIG. 4 depicts the structure of a smart card according to this invention.

The basic structure of a smart card of this kind is presented in FIG. 4 in such a way that the length and width of the card are natural but the height is ten times the real height. Inside the smart card (40) is a semiconductor chip 42 which is outlined with broken lines 41. In this example the chip is of size 15×20 mm=3 cm² and it would too large for the standard 12.5×25 mm GSM smart card for example. The semiconductor chip 42 is encapsulated into the card by at first setting it on to the base 43 of the card and then the base is covered with an upper layer 44 which has a cavity or to which a cavity is formed following the size and shape of the chip.

The surface layer 44 includes the holes 45, 46 and 47 which are optically transparent for certain wave lengths in such a way that the radiation coming through a hole effects only a predetermined part of the semiconductor chip. In the figure this is accomplished using a film 48 which is optically non-transparent but it also has the holes at 45, 46 and 47. It also could be done by coating the integrated circuit chip with for example a metal layer which would have holes at 45, 46 and 47.

Figure 5:
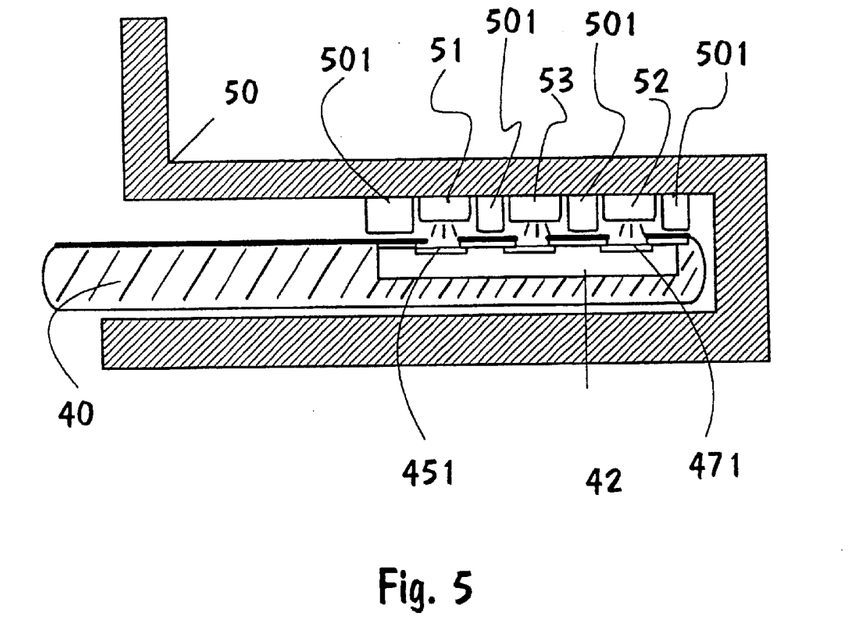
FIG. 5 presents the smart card's attachment to a host unit.

FIG. 5 shows the principle by which the smart card 40 is connected to its host unit using photoelectric circuitry. The host unit supports the smart card 40 with its mechanical structure 50 so that the hosts optical read- and write-heads 51, 52 and 53 are in optical contact with only one hole 45, 46 or 47. In the figure this has been achieved with supports 501 which prevent the mixing of optical radiation from outside the slot as well as from the other optical read- or write-heads. The same can be achieved if the host units mechanical support structures are flat against the smart card and the optical read- and write-heads lie in holes inside the host.

Figure 6:
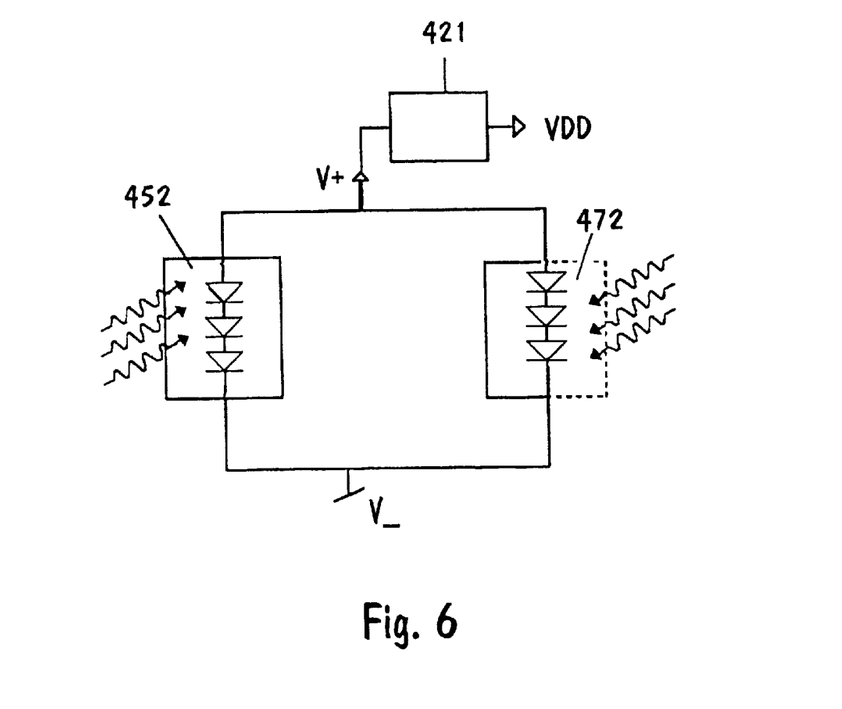
FIG. 6 is the principal circuitry for the smart cards energy supply.

FIG. 6 presents the energy supply from the host to the smart card according to FIG. 5. The integrated circuit chip 42 of the smart card 40 receives energy when the radiation sources 51 and 52 radiate to the photoelectric converters 451 and 472 To feed the desired operating voltage to the integrated circuit chip 42 the semiconductor parts 452 and 472 consist of a number photo diodes in a serial connection, and the voltage forms when the diodes 452 under the hole 45 or the diodes 472 under the hole 47 get enough optical radiation. If only one of the two diode groups generates the necessary voltage the other loads the voltage only insignificantly, because the voltage produced by the diode group is in the same direction and almost equal to the so called threshold voltage of the loading diode group. It is known to regulate the voltage given by the photo diodes with regulator circuits 421 to one (VDD) or several different voltages for the electronics of the integrated circuit chip 42.

Figure 7:
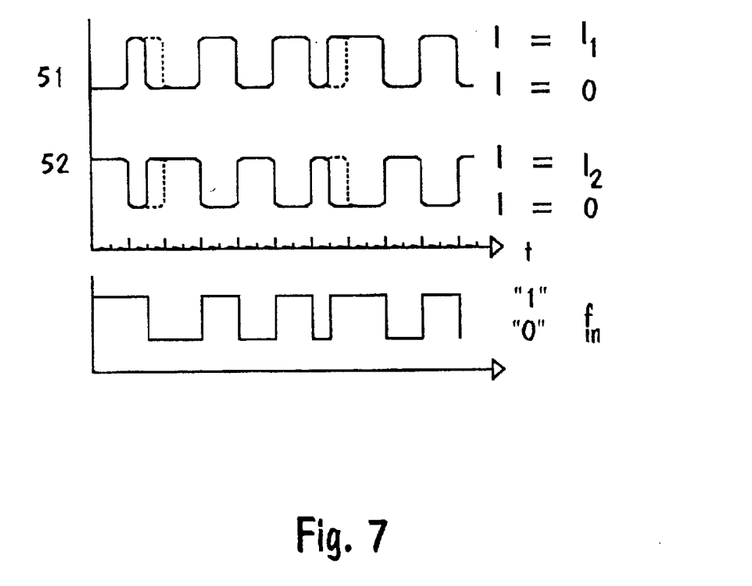
FIG. 7 presents the pulse diagrams for the supply of the clock signal to the smart card.

The above has shown how the operating voltage is brought as optical radiation to the smart card. In the following we show how the clock frequency and the messages are brought to the card. These are explained with FIG. 7, which shows intensity fluctuations of the energy supplying light sources 51 and 52 (FIG. 5) and clock frequency, and FIG. 8, which shows the necessary circuits to receive the dock frequency.

With this invention the same light source gives energy, clock frequency and messages to the smart card. The intensity alternations of the light sources 51 and 52 form the desired clock frequency, FIG. 7. A constant current is alternated with a desired frequency to pass alternating through the light sources 51 and 52, causing intensity of the light to vary between zero and the values $I_1$ and $I_2$ characteristic to the light sources. Because of the total interference the sum of the power taken by the light sources is constant and they don't cause any disturbances into the environment surrounding them.

Figure 8:
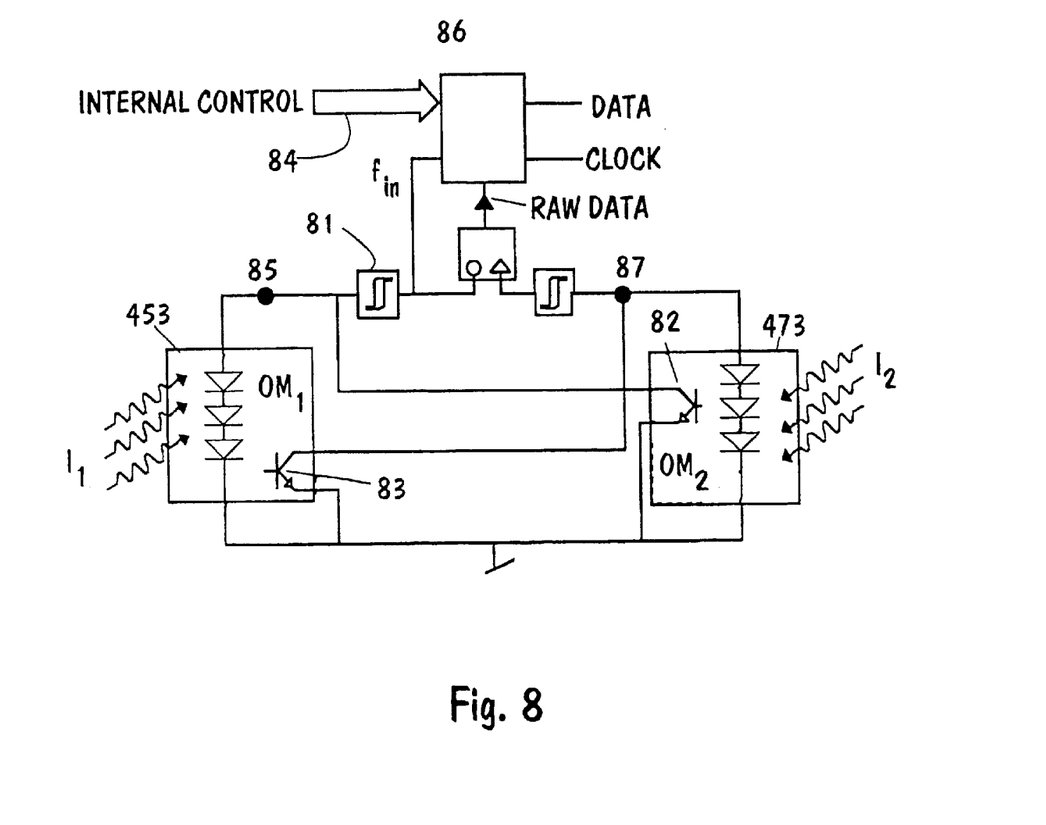
FIG. 8 is the principal circuitry of the smart card to the reception of the clock signal.

The clock frequency and information are received in such a way that there are smaller photo diode groups 453 and 473 compared with the energy receivers 452 and 472 located at the holes 45 and 47, FIG. 8. When the first diode group 453 is radiated with its characteristic intensity $I_1$ the output voltage rises at the point 85 of the FIG. 8 to receive the logical state '1'. This rise in voltage converted to a rapid logical state change by the trigger circuitry 81 and at the same time the output voltage of the other diode group 473 is set to zero with e.g. a switching transistor 82. This state remains as the output signal $f_{in}$ as long as the first diode group 453 is radiated and the other diode group 473 is not. When the radiation changes from the first diode group 453 to the other diode group 473 the radiation intensity changes in a few nano seconds and the corresponding transistor 83 sets the output of the first diode group 453 to zero. The trigger circuitry 81 changes rapidly into a logical state '0' which now forms the signal $f_{in}$ given by the light sources 51 and 52 on the smart cards integrated circuit chip.

The circuitry in FIG. 8 are also used to detect the changes in the phase of the light sources which carries data information. To do this the smart card has the means 86 to detect the positive and negative changes in the phase of the clock signal, to form the equal-phased clock signal 'clock' from the modulated signal $f_{in}$ and also to recognize the modulations as data bit strings DATA. The functions of the means 86 are controlled by the smart card's internal control signal 84 which at one state, 'idle', forms the smart cards desired operating voltage and clock signal $f_{in}$ and otherwise both the smart card and the means 86 are in passive state. In another state, 'active', the means 86 form as the clock signal 'clock' the signal $f_{in}$ and detects the small phase difference signals as the data bit string DATA. The internal control signal 84 is forced into an active state by the trigger signals given by the third light source 53, FIG. 5, which are recognized by the smart card. After this the smart cards internal processor controls the smart cards operations and activity states.

The clock signal 'clock' is formed when intensity $I_1$ rises the voltage at the point 85, FIG. 8, into a value of logical state '1', and at the same time the photo sensitive transistor $OM_1$ forces the value of the signal 87 equivalent to intensity $I_2$ to the logical '0'-state. Similarly when intensity $I_1$ goes to zero and intensity $I_2$ rises, and the voltage at the point 87 rises to a logical '1' and another photo sensitive transistor $OM_2$ forces the signal 85 to logical '0'-state.

Figure 9:
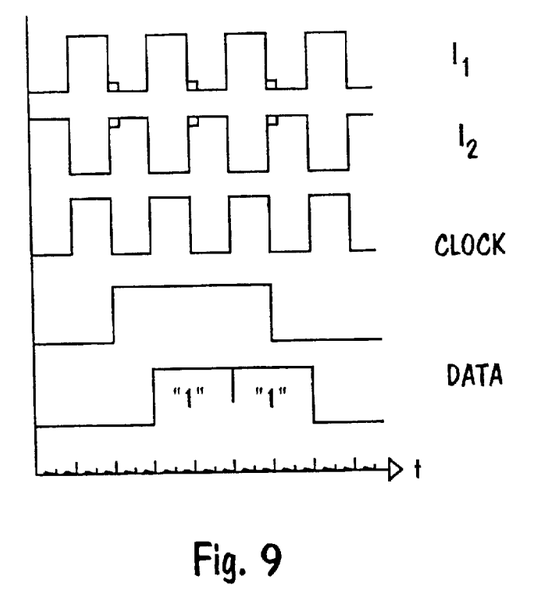
FIG. 9 presents the signal charts related to FIG. 8.

Because the resistance of the photo sensitive transistors $OM_1$ and $OM_2$ rises to infinity immediately after the radiation ends, the circuitry in FIG. 8 form a flip-flop structure following intensity variations of $I_1$ and $I_2$, which output signals 85 and 87 state-changes are successive and not overlapping. If the diode groups 453 and 473 produce more current than the optical transistors $OM_1$ and $OM_2$ take, can a situation presented in FIG. 9 happen. The rising edge of another intensity, $I_2$ for example, can trigger the other intensities, $I_1$ logical state into memory. If at the rising edge of the $I_2$ another intensity $I_1$ is zero the transistor $OM_2$ triggers the signal 85 to zero very quickly and respectively the rising edge of $I_2$ triggers the '0' state to memory. If $I_1$ is non-zero while $I_2$ is rising, the rising edge of $I_2$ triggers the '1' state into memory.

Figure 10:
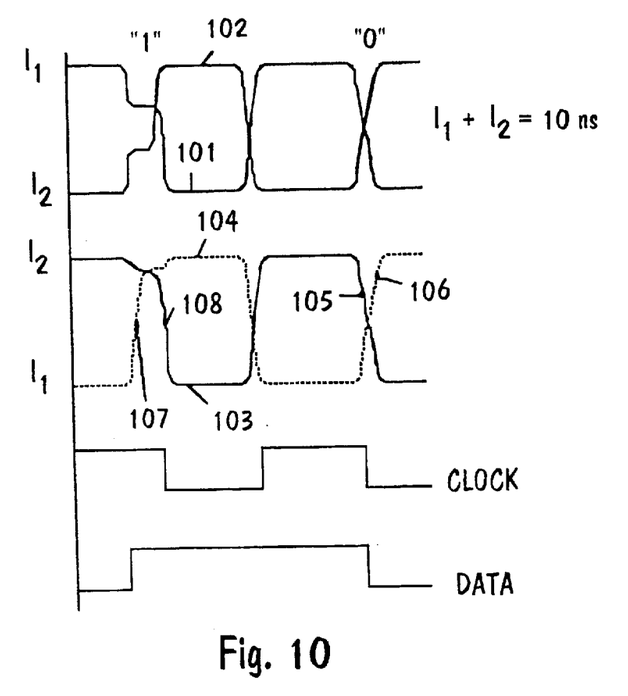
FIG. 10 presents details of the FIG. 9.

FIG. 10 explains the previous with more details. The line 101 presents intensity $I_1$ at the diode group 453 and the line 102 presents the intensity $I_2$ at the diode group 473. The line 103 presents the voltage produced by the diode group 453 and 104 presents the voltage produced by the diode group 473. As in the FIG. 8 $I_1$ becomes the dock signal 'clock'. The phasing of the fight sources and internal delays of the circuit have been set so that the falling edge 105 of the signal detected from $I_1$ has arrived to the means 86 before the rising edge of the signal detected from $I_2$, and so the falling edge 105 of the signal 103 triggers the data signal to zero.

If a time $T_1$ when approaching a periodic crossover point of the intensities $I_1$ and $I_2$, they both differ from zero, the rising edge 107 of the signal detected from $I_2$ comes before the falling edge 108 of the signal detected from $I_1$. Then the falling edge of $I_1$ triggers '1' as the value of the data signal of the means 86. The said crossover is produced so that at a time $T_1$ before the next periodic crossover point $T_2$ of the intensities $I_1$ and $I_2$, both intensities $I_1$, and $I_1$ differ from zero. Therefore the signal 104 corresponding to intensity $I_1$ rises near to its maximum value although $I_1$ is not at maximum and the transistor $OM_1$ is loading its output. The reason for this is that the current produced by the diodes 453 or 473 is significantly greater than the current drained by the transistors $OM_1$ and $OM_2$ at some intensity I. Therefore the signal 103 of intensity $I_1$ drops to zero only after intensity $I_1$ has dropped to zero. Due to the alternating principle $I_{1max}=I_{2max}$.

With the arrangement previously described it is possible to feed the smart card with energy, clock signal and data so that combined total radiation intensity and hence also the current used by the light sources remains constant. Energy needed by the circuitry is therefore relative to energy taken by the smart card and the clock frequency $f_{in}$ and it has no relation to the operating voltage. The efficiency of the energy transport is high, more than 50% of radiation intensity, because when Light Emitting Diodes (LED), which radiate monochromatic light, are used as sources, the pn-junction on the semiconductor chip of the smart card can be optimized to the radiation of the LED in such a way that most of the photons generate an electron/hole pair and thus electric current across the pn-junction. Thus the energy transport is limited only by LED's efficiency to transform electric current to electromagnetic radiation and the optical coupling from the host unit to the integrated circuit chip of the smart card.

Figure 11:
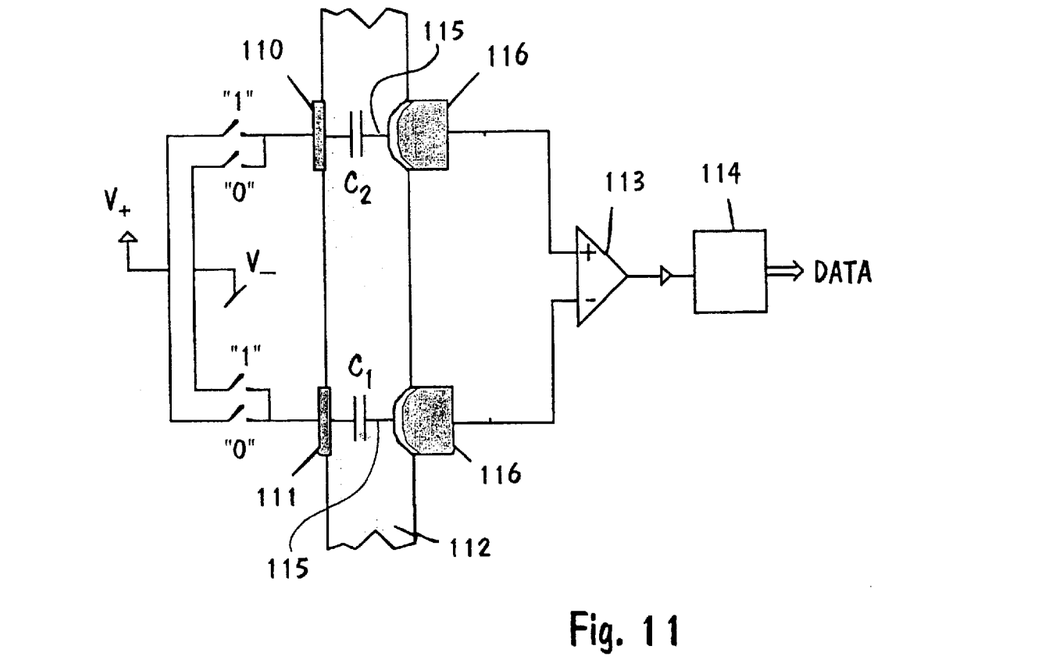
FIG. 11 is a data transfer protocol from the card to the host.

Next we focus on the data transfer from the smart card to the host, FIG. 11. The electronics on the smart card transforms and protects the information with using e.g. known methods of synchronizing code and error correction into digital bit strings, which are then fed with defined clock frequency to the output structure of the smart card. If the data transfer is based on the capacitive proximity connection of the output structure consists of two electrodes 110 and 111, FIG. 11, in which potential is varied between zero and the operating voltage according to the bit string. If the value of the bit on the line is '1' the electrode (110) is switched to the positive operating voltage (e.g. VDD ) and the electrode 111 is switched to the negative voltage (e.g. 0 V) and vice versa if value of the bit is '0'.

The electrodes located on the surface of the integrated circuit chip having a surface area of e.g. 1 mm$^2$, lie inside the smart card under a plastic film 112 and they are in a capacitive connection with the host unit's charge amplifier 113, which capacitance between the inputs typically not exceeding 5 pF. With these values of the capacitor (115) $C_i$ from the smart card's chip to the amplifiers 113 input is 50 fF, which means that a voltage of 1–3 V fed to the electrodes on the surface of the smart card become coupled into a voltage of a few tenths or hundreds of milli Volts on the surface of the host units amplifier 113, in which it becomes amplified and recognized as a message sent by the smart card with using the means 114, which also may include the possibly used error correction methods. The capacitive proximity connection would be more advantageous to implement if the host unit's electrodes 116 would be focused and the smart card would have engraved positions for the said electrodes.

Figure 12:
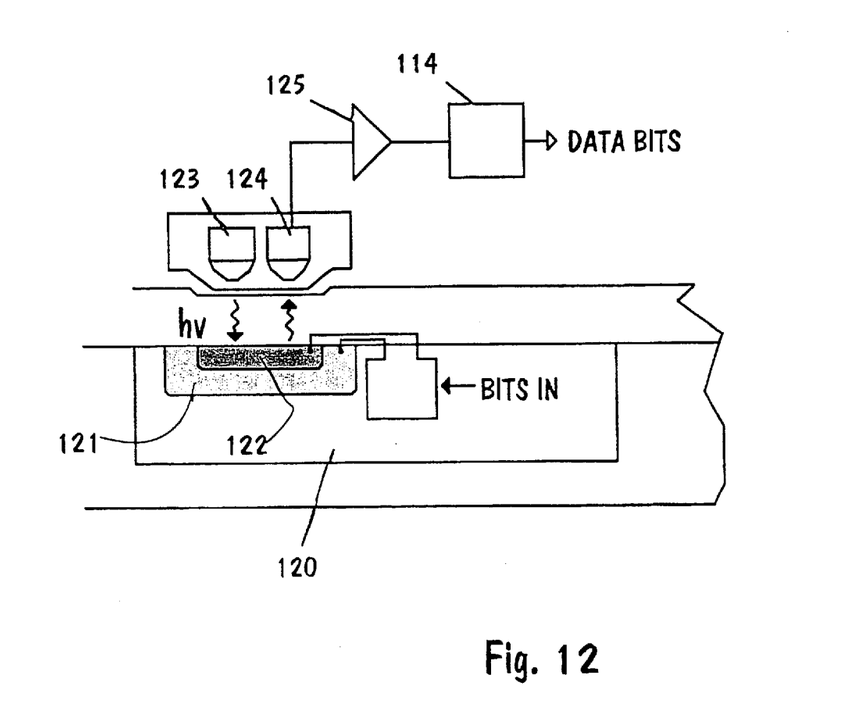
FIG. 12 is another data transfer protocol from the card to the host.

FIG. 12 presents a method alternative for the capacitive proximity connection. The data is transferred through optical reflection modulation in which the voltage between a p-type layer 121 of a semiconductor and an n-type layer 122 of a semiconductor is changed according to the bit on the string to between voltage values of V0 and V1. The value V0 presents the bit '0' and the V1 presents the bit value '1' in such a way that the voltage values V0 and V1 also represent the large and small values of the optical reflection coefficient of the radiation hv from the light source 123, typically a LED. The radiation is reflected by the surface to e.g. a photo diode 124 which output voltage and its variations are then amplified with an amplifier 125 and demodulated with known methods into a data bit string using the means 114.

The capasitivic and optical connections between the smart card and the host are alternative or supplementary methods, which differ only in the generating and receiving of physical signals, the signal processing operations are the same.

In a smart card previously described the most important requirement is the securing of the integrated circuit chips energy supply in the critical moments when the integrated circuit chip is processing etc. This is accomplished with autonomic periods during which the smart card processes an external function or a smart cards spontaneous operation. The smart card has stored energy and clock frequency it needs during the said autonomous period, and it also has signaled to its output that it is in the state of executing an operation. During this execution period the smart card can receive data only to its buffer memory. When the autonomous period starts the card has all the information it needs to perform the operation, e.g. writing to memory. If energy and clock frequency supply continue normally during the operation the smart card goes back to the ready-state and it can perform the next operation according to either the buffer memory or the host unit.

If the receiving of energy or the clock frequency is interrupted during an operation, the actions are branched to an interrupt mode according to each smart card function in such a way that energy and the clock frequency are taken from the storages within the smart cards integrated circuit chip, and the operations are branched in to a proper mode and finally the power is shut down from the integrated circuit chip. This ensures that the host units broken power supply, removal of the card from the host or the host units malfunction would not effect the actions of the smart card or the information stored in it.

In the following we address to the FIG. 13. To ensure the operation of the smart card it has its own internal control for the operating voltage, a clock frequency memory and means to configure the functions for the allowed clock frequency. During the manufacturing of integrated circuit chip the oscillator OSC 130 on the chip is locked to a known reference frequency by storing a number M on to the chip, by which the frequency of the oscillator OSC 130 is divided resulting a known frequency. This result is then compared with frequencies derived by dividing the received clock frequency by $N_1$ and $N_2$. If the frequency of the oscillator OSC 130 divided by M is between the external frequency divided by $N_1$ and $N_2$, the actually used external clock frequency is between the highest and lowest allowable frequencies defined at the manufacturing stage of the integrated circuit chip. If it is not the smart card will signal a malfunction.

Figure 13:
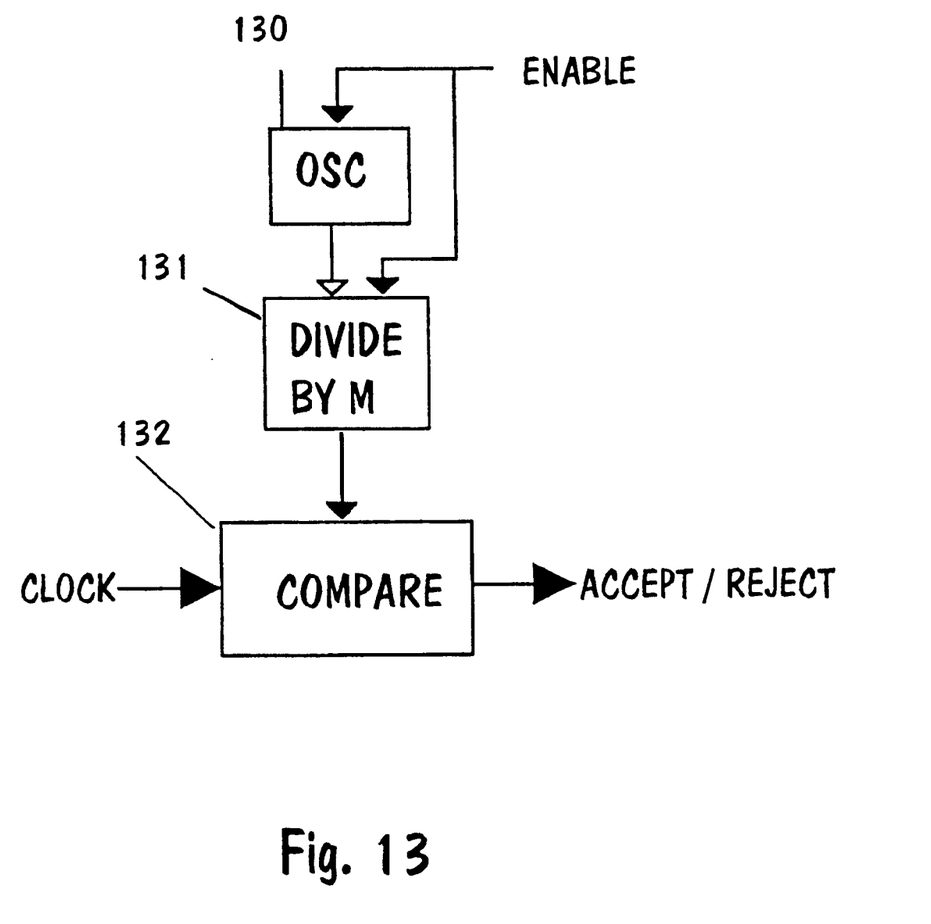
FIG. 13 illustrates the method and the structure with which the smart card recognizes if the clock signal is in the frequency range allowed.

While the circuit is operating the OSC is used every now and then, e.g. when the functions a started with the ENABLE-signal, FIG. 13, its frequency is divided in the divider 131 by the figure M stored in the chip. This frequency is then compared to the clock frequency coming to the chip in the comparison circuit 132 by e.g. counting the number of pulses of the external clock frequency. If this number is greater than the smallest figure, divided by $N_1$, and smaller than the largest figure, divided by $N_2$, the circuit will set it self into an active state according to the ACCEPT-REJECT-signal and it will also show the state to the host unit, so called Answer to Reset or ATR-function. Because the oscillator OSC on the chip always represents the real speed of the circuit the clock frequency at which the circuit can be safely operated is known at all times.

A smart card of this kind would be known for its ability to interact in the setting of the clock frequency according to the cards abilities and application requirements. Further more the card is characterized by the input of optical energy from the host to the card being controlled according to the requests made by the card.

With this invention the following features of a smart card can be achieved:
cheap to manufacture
reliable
completely protected against the adverse effects of the environment
flexible for operating speeds
independent of the operating voltages and transferable from host to host
no limits are set to the size of the integrated circuit chip(s) inside the card
reliable operation.

Smart cards of this kind and the methods to attach it to a host unit would be suitable for portable and pocket-sized means, credit cards, storage means for mass information etc. This invention has a broad area of applications and the invention covers variations according to patent claims dealing with a contactless smart card, its structure and applications.

What is claimed is:

1. A method of transferring energy, clock frequency and data from a host equipment to a smart card's semiconductor chip which is connected to the host equipment without an electrically conducting contact, comprising the steps of:
   transferring energy to the smart card as optical radiation from at least two distinct light sources;
   varying light intensity of each of the light sources periodically between maximum and minimum values in such a way that while a radiation intensity of one of the light sources goes from minimum to maximum, a radiation intensity of the other of the light sources changes accordingly from maximum to minimum so that total intensity of light emission remains essentially constant;
   transmitting the clock frequency via a cyclical alteration of energy transfer from the light sources wherein the alteration frequency of the radiation sources becomes the clock frequency for the smart card; and
   transferring data as a modulation of the clock frequency.

2. The method according to claim 1, wherein the data information is demodulated using a pre-defined edge of one radiation intensity to trigger the state of the other radiation intensity to the logical state of the data.

3. The method according to claim 1, wherein the data transfer from the smart card to the host equipment is performed from the surface of the integrated circuit chip in the smart card by using an electromagnetic proximity connection.

4. The method according to claim 1, wherein the optical radiation from the distinct light sources are guided to separated areas on the smart card's surface.

5. The method according to claim 1, wherein the optical radiation from the distinct radiation sources are guided to an essentially single area on the smart card's surface and distinguished therein from their different wavelengths and using distinct detectors to detect different wavelengths.

6. A smart card for storing and processing of information, comprising:

a semiconductor chip in the card;

at least one optically transparent area on a surface of the card for receiving radiation from two or more light sources and for guiding the radiation on to a defined area on the semiconductor chip;

means for converting optical radiation guided to the defined area into electric energy, said means comprising, two photo-voltaic converters, the first of said converters converting alternating radiation intensity into an electrical signal, and the second of said converters converting received alternating radiation intensity into an electrical signal, the radiation intensities being arranged in such a way that the sum of said electrical signals is essentially constant.

7. The smart card as in claim 6, further comprising means for producing a continuous operating voltage from the received alternating radiation intensities.

8. The smart card as in claim 6, wherein both photo-voltaic converters are connected to a triggering circuitry which converts the output of photo-voltaic converters into a two stage signal and that the output of the triggering circuitry is used as the clock signal of the smart card.

9. The smart card as in claim 8, wherein the triggering circuitry additionally contains a flip-flop circuit where a data input is connected to the output of one of said photo-voltaic converters, and a clock input is connected to the output of the other of said photo-voltaic converters, and the output of which is a data signal representing a value of one radiation intensity as triggered by an edge of the other radiation intensity.

10. The smart card as in claim 6, further comprising capacitive electrodes located on defined areas of the semiconductor chip, a potential of the capacitive electrodes being altered between two values according to data to be transferred from the smart card to a host unit.

11. The smart card as in claim 6, further comprising a pn-junction on a surface of the semiconductor chip, said pn-junction being optically observable through the surface of the smart card, and an optical reflection coefficient of said pn-junction being altered by a voltage across the pn-junction according to data to be transferred.

12. The smart card as in claim 6, further comprising an internal oscillator attached to a divider with a division number M, and another divider for dividing an externally applied clock frequency with a division number N for detecting via comparison whether the externally applied clock frequency is between a minimum and maximum values and thus acceptable for operation of the smart card.

13. The smart card as in claim 12, further comprising means for storing energy which is required during one basic operation in such a way that when the energy supply from an external source becomes interrupted during the operation, the smart card performs a controlled interruption by using said stored energy and the internal oscillator as the clock frequency.

14. A reader for a smart card having space for adopting and supporting the smart card, the reader comprising two light sources optically isolated from each other when the smart card is supported by the reader, a light intensity of each of said two light sources varying periodically between maximum and minimum values in such a way that while the light intensity of one of said sources goes from minimum to maximum, the light intensity of the other of said sources changes accordingly from maximum to minimum so that a total intensity of the light sources remains essentially constant.

* * * * *